United States Patent [19]

Thompson et al.

[11] Patent Number: 4,753,555
[45] Date of Patent: Jun. 28, 1988

[54] APPARATUS AND METHOD FOR THE DRILLING AND INSPECTING OF HOLES

[76] Inventors: Douglas Thompson, 8610 142nd Ave. NE., Redmond, Wash. 98052; David A. Yousko, 14600 SE. 176th St., #D-1, Renton, Wash. 98055

[21] Appl. No.: 948,032

[22] Filed: Dec. 31, 1986

[51] Int. Cl.⁴ .................... B23B 35/00; G01B 7/12
[52] U.S. Cl. ................... 408/1 R; 33/169 C; 33/178 F; 408/2; 409/133
[58] Field of Search .......... 29/26 A; 267/150; 408/2, 1, 714, 16; 33/169 C, 178 F, 178 E; 409/133; 901/45

[56] References Cited

U.S. PATENT DOCUMENTS

| | | |
|---|---|---|
| 2,235,533 | 3/1941 | Roberts . |
| 2,563,216 | 8/1951 | Dale . |
| 2,616,183 | 11/1952 | Roberts . |
| 2,638,681 | 5/1953 | Kinley et al. . |
| 2,642,671 | 6/1953 | Graham et al. . |
| 2,799,092 | 7/1957 | Abramson . |
| 2,799,946 | 7/1957 | Mayes . |
| 2,810,203 | 10/1957 | Bahofer . |
| 3,488,856 | 1/1970 | Wiklund . |
| 3,958,338 | 5/1976 | Anichini et al. ............... 33/178 E |
| 4,080,089 | 3/1978 | Matsushima .................... 408/2 |
| 4,121,345 | 10/1978 | Roesner ........................... 33/178 F |
| 4,242,017 | 12/1980 | De Fazio ......................... 33/169 C |
| 4,332,066 | 6/1982 | Hailey et al. .................... 29/26 R |
| 4,400,885 | 8/1983 | Consales ......................... 33/169 C |
| 4,407,157 | 10/1983 | Lichtenberg ................. 33/178 F X |
| 4,439,926 | 4/1984 | Whitney et al. ................ 901/45 |
| 4,485,562 | 12/1984 | De Fazio ......................... 267/150 |
| 4,622,751 | 11/1986 | Berg ................................. 33/169 C |
| 4,627,169 | 12/1986 | Zafred ............................. 33/169 C |

FOREIGN PATENT DOCUMENTS

| | | | |
|---|---|---|---|
| 859811 | 12/1952 | Fed. Rep. of Germany .... | 33/178 F |
| 58-80509 | 5/1983 | Japan ............................... | 33/178 F |

*Primary Examiner*—William R. Briggs
*Attorney, Agent, or Firm*—Hughes, Cassidy & Multer

[57] ABSTRACT

An apparatus and method for first drilling a hole in a workpiece by utilizing a locating jig, and then inspecting the hole to insure it is drilled to the proper diameter. There is an inspection device having an inspection probe that is pivotally mounted about a universal mounting device so that the lower inspection end of the probe is able to deflect laterally to fit in the drilled hole so as to be centered therein. This arrangement compensates for any misalignment in the positioning of the inspection apparatus relative to the earlier alignment of the drilling apparatus.

20 Claims, 4 Drawing Sheets

APPARATUS AND METHOD FOR THE DRILLING AND INSPECTING OF HOLES

BACKGROUND OF THE INVENTION

1. Field of the Invention

The present invention relates to a method and apparatus of drilling holes and inspecting the same, and more particularly, to such an apparatus and method for determining the accuracy of drilled holes in a robotic-type assembly.

2. Background Art

It is common in the aircraft industry and other industries to drill a plurality of holes through workpieces which are to be joined to one another. Quite commonly, this is accomplished by placing a locating jig over the workpiece into which the holes are to be drilled, with the locating jig having a plurality of tapered locating holes. The drill assembly is commonly be made up of a drill housing which can be moved vertically into engagement with the locating jig. More specifically, the drill assembly has a housing with a tapered locating cone that comes into locating engagement with the locating holes in the jig. Then the drill itself is moved downwardly from the housing into engagement with the underlying workpiece to drill the hole through the workpiece.

It is of course necessary to inspect the holes to insure that these are drilled accurately to the proper diameter within certain tolerances so that these will properly receive the fastener to form the desired connection. Quite commonly, the tolerance of these holes must be within a fraction of a thousandth of an inch. There are various quality control devices which can be used to measure the diameter of a drilled hole, and in some of the devices there is an inspecting probe having laterally movable elements which engage the surface defining the hole and sensing means connected therewith to provide a reading of the hole diameter.

In recent years, the use of robotics in the drilling and inspection of holes has been a subject of increasing study. One of the problems in such an automated drilling and testing system is having the components operating within reasonably close tolerances to accomplish these functions properly. There is generally a certain amount of flexibility and inaccuracies in robotic mechanisms, and this must be considered in the overall drilling and inspection process.

Thus, there exists a need for a simple, robust, and accurate method and apparatus to gauge a hole diameter in the environment described above, and also to provide an effective drilling and inspecting apparatus and method for use in such a robotic environment.

SUMMARY OF THE INVENTION

The present invention comprises a hole drilling and inspection assembly adapted to operate in conjunction with a locating jig, and also relates to the inspection apparatus itself for use in such an assembly. This is used in conjunction with a jig having at least one locating hole where the assembly first drills a hole in a workpiece and then inspects the drilled hole.

The assembly comprises first a drilling apparatus having a drill locating element positioned to come into engagement with the locating hole of the jig. The drilling apparatus further has a drill member to move through the drill locating element and through the locating hole to drill the hole in the workpiece along a hole alignment axis.

The inspection apparatus comprises a first inspection support housing having an inspection alignment axis and an inspection locating element. The support housing is adapted to be positioned with the inspection locating element engaging the locating hole of the locating jig and with the inspection alignment axis aligned with the hole alignment axis within a predetermined tolerance limit.

There is a second movable housing mounted in the support housing for upward and downward axial movement along the inspection alignment axis relative to the support housing.

There is also an inspection probe having a lower laterally yielding inspection end contact portion adapted to yieldingly engage a hole surface defining the hole in the workpiece. This is done in a manner that the end contact portion is centered in the hole. This probe has a probe alignment axis.

The inspection probe also has an upper mounting end by which the probe is pivotally mounted in said second housing about an upper pivot location in a manner that the inspection end contact portion is able to be deflected laterally so that the probe alignment axis is deflected from the inspection alignment axis. Thus, under circumstances where after the hole has been drilled and the inspection apparatus has been positioned for inspection, the inspection alignment axis is out of alignment with the hole alignment axis, the lower inspection end contact portion of the probe is able to deflect laterally about the upper pivot location. This deflects the probe alignment axis from the inspection alignment axis and places the end contact portion of the probe centrally located relative to the drilled hole in a manner that an accurate inspection of the hole can be obtained.

In the preferred form, the upper mounting end of the probe is mounted to the second movable housing about a universal mounting means. Thus, the inspection end contact portion of the probe can be deflected laterally in substantially all lateral directions. More specifically, the mounting end of the inspection probe has a curved contact surface which fits against a matching mounting curved contact surface of the second movable housing so that the two curved contact surfaces can move relative to one another.

Also, there is a spring means interfitting with the probe and the second movable housing in a manner to yieldingly urge the probe axis into alignment with the inspection alignment axis. In one form, the spring means is a compression spring mounted around the inspection probe and pressing against the inspection probe and the movable housing in a manner to urge the probe upwardly against the movable housing. In another form, the spring means comprises a spring finger means having spring ends engaging the probe below the upper pivot location so as to center the probe.

In the preferred form, the assembly comprises a robotic assembly, including robotic control means to first position the drill locating element into engagement with the locating hole and to cause the drill member to drill the hole in the workpiece. Then the control means moves the locating element of the inspection apparatus into engagement with locating hole and causes the probe to move so that the inspection end contact portion moves into the drilled hole so as to inspect the same.

The preferred form of the probe comprises a plurality of downwardly extending probe arms, each of which has a laterally deflectable end arm portion. The positioning of the end arm portions affect the inspection operation of the robe. The probe is sufficiently easily deflectable to enable the end contact portion of the arms to become properly centered in the drilled hole.

Other features will become apparent from the following detailed description.

DESCRIPTION OF THE PREFERRED EMBODIMENTS

Figure 1:
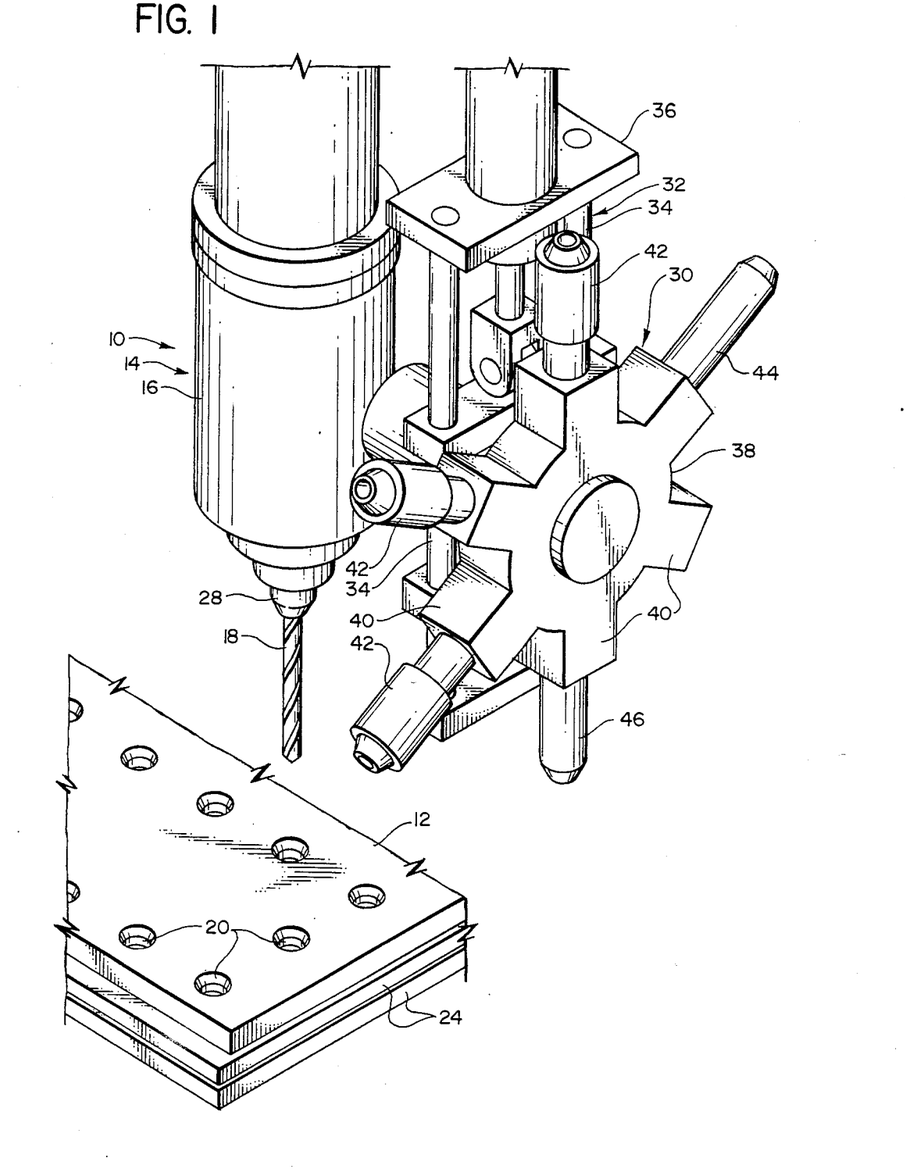
FIG. 1 is an isometric view illustrating a robotic drilling and inspection assembly incorporating the present invention.

With reference to FIG. 1, there is shown a drilling and inspection apparatus 10 incorporating the present invention, with this apparatus being shown in a position to operate in conjunction with a final assembly jig 12. There is a drilling structure 14 comprising a drill housing 16, in which is mounted a retractable drill element or bit 18. This drilling structure 14 is, or may be, in and of itself of conventional design.

Figure 2:
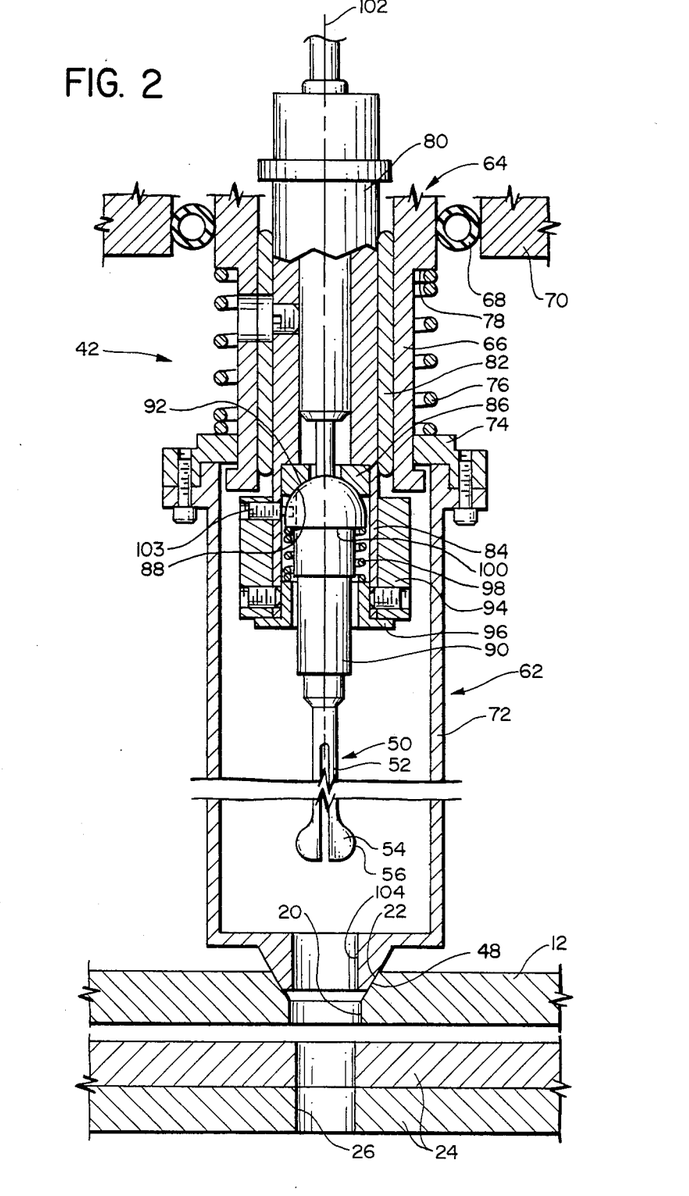
FIG. 2 is a view of one of the inspection components incorporating the present invention, with this being a sectional view taken through the longitudinal center line of the apparatus, and with this inspection component being in locating engagement with the locating jig in preparation for making an inspection.

The final assembly jig 12 is provided with a plurality of locating holes 20. As illustrated in FIG. 2, such locating holes 20 have a downwardly and inwardly tapered entry surface portion 22 (this being of a frusto-conical configuration). Also, as shown in FIG. 2, there is a workpiece, comprising two members 24 in which a hole 26 has been drilled so that a fastener can be placed in this hole 26 to join the two members 24 one to another. As indicated previously, it is necessary that this hole 26 be drilled within very close tolerances (e.g. within a fraction of a thousandth of an inch).

The housing 16 of the drilling structure 14 has a locating nose section 28 of a frusto-conical configuration to properly engage the tapered entry surface portion 22 of the locating hole 20. In operation, the drill bit 18 is retracted into the drill housing 16, and the housing 16 is lowered so that the nose section 28 comes into engagement with the entry portion 22 of the locating hole 20. Then the drill structure 14 is operated so that the drill bit 18 moves downwardly through the locating hole 20 to drill the hole 26 through the two members 24 that comprise the workpiece.

The drilling and inspection assembly 10 further comprises the inspection apparatus 30. This inspection apparatus 30 comprises a vertically movable mounting frame 32 comprising a pair of vertically aligned rods 34 which are slidably mounted in a support structure 36. The inspection apparatus 30 further comprises an inspection housing 38 rotatably mounted about a horizontal axis of rotation to the aforementioned frame 32 incorporating the rods 34.

In the particular arrangement shown herein, the inspection housing 38 has six mounting locations 40 positioned at equally spaced intervals around the periphery of the inspection housing 38. At three of these mounting locations 40, there are three inspection components 42 (arranged to inspect holes of different diameters). At a fourth location, there is provided an ink jet component 44, the function of which is to deposit ink or some other marking medium on a hole which does not pass inspection. There is an air blast component 46 mounted at another location 40, the function of this being to blow into the drilled hole 26 and remove debris therefrom. A sixth location 40 is provided for the addition of another component, if desired.

The present invention is directed particularly toward the structure of the inspection components 42 in this overall assembly. It is believed that a clearer understanding of the present invention will be achieved by first discussing the overall operation of the drilling and inspection assembly 10, and then following this with a more detailed description of the embodiments of the inspection components 42.

The usual mode of operation of the drilling and inspection assembly 10 is as follows. Let it be assumed that the workpiece (comprising the members 24) is in place relative to the final assembly jig 12. The entire assembly 10 is moved to a location so that the locating nose section 28 of the drill housing 16 is in vertical alignment with a selected one of the locating holes 20 of the jig 12. At this time, the drill bit 18 is retracted in the housing 16. The housing 16 is lowered so that the nose section 28 comes into engagement with the tapered entry surface portion 22 of the selected locating hole 20 so as to center the locating nose section 28 relative to the jig locating hole 20. Then the drill bit 18 is moved through the selected locating hole 20 into engagement with the workpiece 24—24 to drill the hole 26. After this is accomplished, the drill housing structure 14 is raised and the drill bit 18 retracted in preparation for a second drilling operation.

Subsequent to the drilling operation, the entire assembly 10 is moved laterally so that the inspection housing 38 is centered over the locating hole 20 below which the hole 26 has been drilled. The air blast component is positioned downwardly and the housing 38 lowered to place the component 46 in position to blow out the hole 26 to remove any debris. The inspection housing 38 is rotated to bring the appropriate inspection component 42 of the inspection apparatus 30 in vertical alignment over the locating hole 20 below which the hole 26 has been drilled. Then the inspection housing 38 is lowered again so that a locating nose or cone 48 on the inspection component 42 comes into engagement with the tapered surface 22 of the locating hole 20, so that the inspection component 42 is properly centered relative to the locating hole 20, in a manner similar to the centering of the nose section 28 of the drilling structure 14.

With the inspection component 42 being thus centered on the locating hole 20 of the jig 12, an inspection probe 50 is moved downwardly from within the inspection component 42 through the selected locating hole 20 and into the drilled hole 26. This inspection component 50 provides a reading as to whether or not the hole 26 has been drilled within proper tolerance. (This particular operation will be described in more detail later herein in connection with the novel features of the present invention).

If the hole 26 properly passes inspection, then the same operation as described above is repeated, with subsequent holes being drilled and inspected. However, if the hole 26 does not pass inspection, then the control circuitry in the apparatus 10 causes the inspection apparatus 30 to move the ink jet component 44 into engagement with the appropriate locating hole 20 to mark the particular hole 26 which is faulty.

The particular control circuitry will differ for various devices, but it is common that if two such holes 26 are inspected sequentially and these do not pass inspection, then the control circuitry causes the assembly 10 to move to another location where the control system causes another drill bit 18 to be mounted into the drill housing 16. Then the apparatus 10 is caused to drill and inspect a test hole in a test setup to make sure that the new drill is operating properly, and the operation can then proceed as indicated above.

As indicated previously, one of the problems is the reliability of the inspection process in this overall apparatus and method. It is to be recognized that while there are inaccuracies in drilling the hole 26 to a precise round configuration of the proper diameter, there are also certain inaccuracies inherent in the inspection process itself. These can be due to various factors, and the present invention is based to some extent upon a recognition of the significance of these factors and how they relate to the overall drilling and inspection process. It should be further recognized that there are practical difficulties in aligning either or both of the drilling structure 14 and the inspection apparatus 30 within precise tolerances over the selected locating hole 20. If there is, for example, a small amount of misalignment between the drill housing 16 and the selected locating hole 20, the tapered nose section 28 engaging the tapered entry surface 22 of the hole 20 will shift the lower part of the drill housing 16 laterally by a small increment (depending upon the amount of misalignment), so that the center axis of the drill housing 16 will be tilted very slightly. Even though there is this very slight tilting of the center axis, a quite acceptable hole 26 can be drilled and properly receive the fastener.

However, during the subsequent inspection process, the inspection apparatus 30 may be positioned over that same locating hole 20 at a location very slightly offset from the prior location occupied by the drill structure 14. Then, when the inspection component 42 is lowered into engagement with the locating hole 20, the center axis of this inspection component 42 may be aligned slightly differently then the center axis of the drill housing structure 16. The result is that the inspection probe 50 enters the hole 26 at a slightly off-center location and/or alignment.

A further complicating factor is that different inspection probes have different operating characteristics, and depending upon these particular characteristics, the probe may react differently to the different factors which could conceivably introduce an inspection error. One inspection probe 50 which has been found to be acceptable for use in the present invention is a split ball type probe which is marketed under the trademark "DIATEST". The lower end of such a probe is illustrated in FIG. 6, and this comprises a plurality of probe arms 52 (only the lower end of each which are shown in FIG. 6), and at the lower end of each arm 52 there is an end contact portion having a curved contact surface 56, which in cross-section taken along a vertical plane passing through the center axis is circularly curved.

Positioned within the contact arm 52 is a sensing element 58 having at its lower end an accurately ground conical surface 60. The inner upper edge portions of each contact portion 54 bears against this cone-shaped surface.

Figure 6:
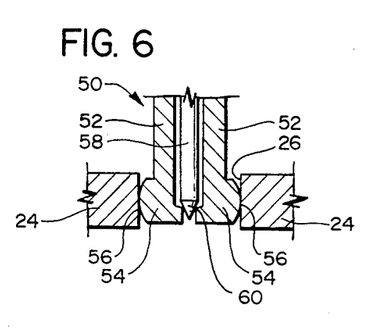
FIG. 6 is a sectional view of the end of an inspection probe used in the present invention.

In FIG. 6, the end contact portions 54 of the arm 52 are shown positioned in a hole 26 formed by a workpiece member 24. It can be seen that the outer contact surfaces 56 bear against the surface defining the hole 26, and that these contact portions 54 in turn determine the position of the sensing element 58 by bearing against and locating the conical surface 60.

The type of inspection probe 50 shown in FIG. 6 has been found to be particularly well adapted for use in the present invention, and this will be discussed further below.

Each of the inspection components 42 is of substantially similar construction, with essentially the only difference being the size of the inspection probe 50. With reference to FIG. 2, the component 42 comprises a housing structure 62 and a probe-carrying structure 64 which is positioned to move vertically within the housing structure 62. The housing structure 62 in turn comprises two parts.

First, there is a mounting cylinder 66 having a cylindrical configuration which is mounted by means of a slightly flexible ring or gasket 68 to a ring structure 70 that is fixedly attached to the aforementioned inspection housing structure 38.

Secondly, there is a cylindrical housing section 72, the upper end of which has a collar structure 74 that fits in close engagement with the outer surface of the cylindrical housing 66. The aforementioned locating nose or cone 48 is mounted to the lower end of this housing structure 72. A compression spring 76 bears against the upper surface of the collar 74 and also engages an annular shoulder 78 formed at the upper end of the housing section 66. This compression spring 76 urges the lower housing section 72 downwardly. Thus, the lower housing section 72 can move upwardly a moderate distance around the upper section 68, with this upward movement being resisted by the compression spring 76. The purpose of this is to permit a certain amount of yield in this overall housing structure 62 when the locating cone or nose 48 comes into contact with the tapered surface 22 of the locating hole 20 of the jig 12.

Mounted for up-and-down movement within the housing section 62 is the probe carrying structure 64, and this comprises a probe housing 80. This housing 80 has a cylindrical configuration and is positioned within a cylindrical sleeve or bushing 82 which in turn is positioned within the aforementioned upper housing section 66.

This cylindrical housing member 80 has at its lower end a downward cylindrical extension 84 of a moderately increased inside diameter. Positioned within this cylindrical extension 84 just below the main housing section 80 is a mounting insert 86 which presents a downwardly and inwardly facing concave spherical surface 88. There is a lower probe housing section 90 that is positioned within the cylindrical extension 84, and the aforementioned inspection probe 52 is mounted to and extends downwardly from this lower probe housing section 90. The upper end of this probe housing section 90 is formed with an upwardly facing convex spherical bearing surface 92 which bears against the convex bearing surface 88 of the mounting insert 86.

Affixedly attached to and surrounding the aforementioned downward housing extension 84 is a collar 94 having at its lower end a retaining ring 96. There is a compression spring 98 positioned around the upper portion of the probe housing 90. This spring bears against the aforementioned collar 96 and presses against a downwardly facing shoulder 100 formed at the upper portion of the probe housing 90. The effect of this compression spring 98 is to place the upper spherical probe housing surface 92 into engagement with the aforementioned concavely curved bearing surface 88 of the mount 86, and also to tend to center the inspection probe 50 along the longitudinal center axis 102 of the component 42. Thus, it is readily apparent that the inspection probe 50 is able to rotate laterally about a center point defined by the curvature of the surfaces 88 and 92, with these surfaces 88 and 92 acting as something of a universal joint. Further, the compression spring 98 provides a relatively moderate restoring force to tend to center the probe 50 relative to the axis 102. To prevent rotation of the inspection probe 50 about the axis 102, there is provided a positioning screw 103 engaging a vertical slot in the probe housing 90.

It has been found that the particular arrangement of the inspection component 42, as described above, cooperates with the entire assembly 10 in a manner to provide substantially greater reliability in the inspection of the holes 26. This will be better appreciated by a review of the operation of the inspection process using this particular inspection component 42.

To describe the operation of this inspection component 42, let it be assumed that the drilling of a hole 26 has been completed, and that the inspection component 42 is now aligned above the locating hole 20. First, the mounting frame 32 is lowered to place the locating cone or nose 48 into contact with the tapered locating hole surface 28, as shown in FIG. 2. The next step is to move the probe housing 80 downwardly within the housing 62 so that the end contact portions 54 of the arms 52 pass through a lower opening 104 formed in the locating cone 48. For the moment, let it be assumed that there is some slight misalignment between the vertical center axis of the hole 26 and the center alignment axis 102 of the component 42. This could result from either the drill structure 14 being slightly out of alignment during the drilling operation, or the inspection component 42 being slightly out of alignment, a combination of both of these factors, or possibly some other factor. As the contact elements 54 begin to move into the hole 26, if the lower end of the probe 50 is not precisely aligned with the hole 26, as the lower tapered portion of the contact surfaces 56 move into the hole 26, there will be a slight pivoting motion of the probe 50, this taking place about the center of the spherical bearing surfaces 88 and 92. The compression spring 98 provides a small resistance to this pivoting, but the strength of the spring 98 is selected so that this resistance is sufficiently small so that it would not introduce any significant error into the operation of the inspection probe 50. Rather, the rather small forces exerted by the side surface of the hole 26 against the contact surfaces 56 simply center the contact ends 54 in the hole 26 so that a proper reading can be obtained.

It is to be understood that the inspection probe 50 contains within its housing structure 90 certain sensing apparatus responsive to the location of the sensing element 58, as determined by the positioning of the end contact portions 54 so as to provide a reading of the diameter of the hole 26. The inspection component 42 also contains a suitable mechanism (not shown here for ease of illustration) which is able to rotate the component 42 so as to obtain additional readings of the diameter of the hole 26. Since this can be accomplished by means already known in the prior art, this will not be described herein.

It has been found that by use of the present invention, the particular mounting of the probe 50 permits the inspection end or portions 54 to reliably to perform their inspection function. It has further been found that the misalignment which may occur because of the normal operating tolerances of the robotic mechanisms and other factors are not sufficient to cause inacurracies in the inspection process beyond acceptable limits. Further, the very moderate restoring force provided for the probe 50 is not sufficient to introduce any inaccuracies beyond acceptable limits. Thus, while the actual inspection process can take place within very close tolerances (e.g. 0.0002'), there can be substantially greater inaccuracies in the placement and operation of the other operating components with which it is associated.

To comment further on certain functional aspects of the present invention, we can consider the relationship between three alignment of axes. First, there is the hole alignment axis which is the axis along which the drill element 18 operates to form the hole 26. Second, there is the inspection alignment axis which is the center alignment axis 102 along which the inspection component 42 is aligned at the time of making its inspection. In the normal operation of the robotic assembly, it can be assumed that the inspection alignment axis will be aligned with the hole alignment axis within a predetermined tolerance range or limit. Third, there is the probe alignment axis, and this is the longitudinal axis about which the probe 50 is centered. The spring member 98 urges the probe 50 into a center position so that the probe alignment axis would normally be substantially coincident with the inspection alignment axis 102.

In the operation of the present invention, under circumstances where there is a certain misalignment between the hole alignment axis and the inspection alignment axis 102, there will generally be a deflection of the probe 50 so that the probe alignment axis along which the arms 52 are centered will move out of alignment with the inspection alignment axis and closer to alignment with the hole alignment axis. However, while there will generally be some misalignment between the probe alignment axis and the hole alignment axis, because of the centering effect permitted by the mounting of the probe 50, a quite accurate reading of the hole diameter can be achieved.

Figure 3:
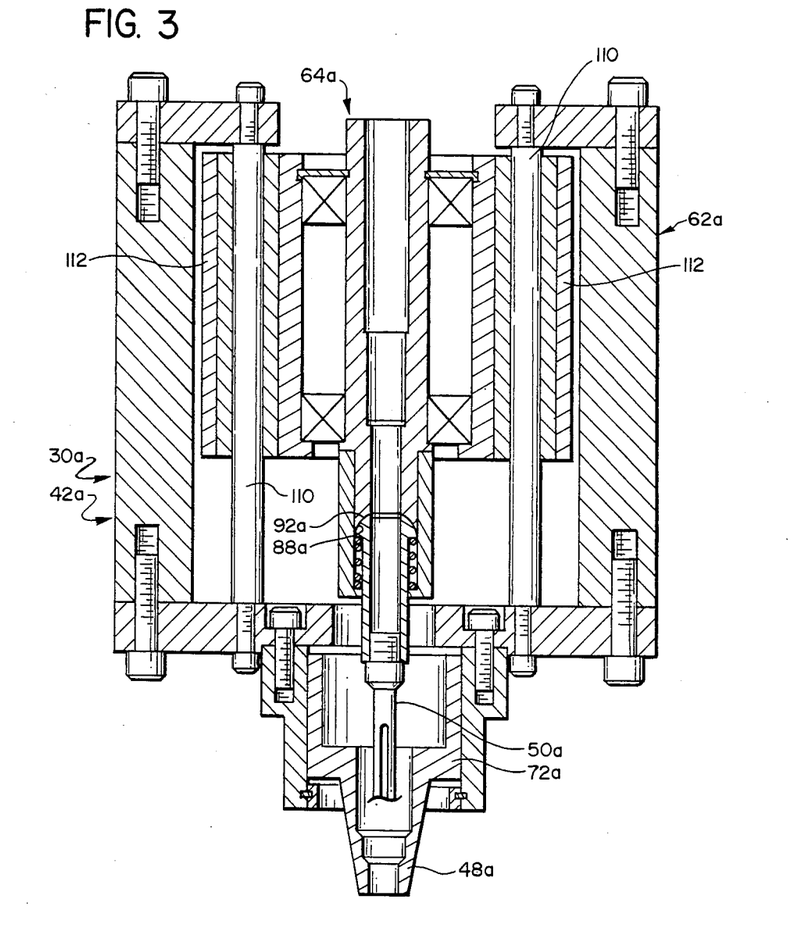
FIG. 3 is a side elevational view of a modified inspection component of the present invention, which is a second embodiment.

FIG. 3 shows a second embodiment of the present invention. Components of the second embodiment which are similar to the first embodiment will be given like numerical designations with an "a" suffix distinguishing those of the second embodiment.

Essentially, this second embodiment is the same in its basic function as a first embodiment, in that the inspection apparatus 30a comprises an inspection component 42a having an inspection probe 50a. There is a housing section 72a having the locating cone or nose 48a. Further, there are the spherical bearing surfaces 78a and 82a which permit the proper lateral pivot motion of the probe 50a.

This second embodiment 30a is an experimental prototype, and is illustrated primarily to show a mounting system for the probe carrying structure 64a. The housing 62a is made substantially larger in diameter, that is provided with a plurality of mounting rods 110, and the entire probe carrying structure 64a has outer portions 112 slide mounted on these rods 110. There is a suitable drive motor to move the probe carrying structure 64a upwardly and downwardly along the mounting rods 110. The basic operation relative to accomplishing the inspection function is substantially the same as in the first embodiment, so no further detailed description will be contained herein.

Figure 4:
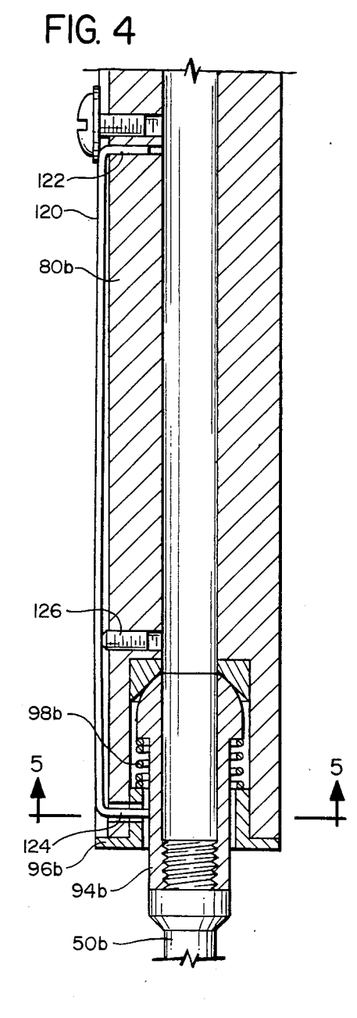
FIG. 4 is a sectional view taken along the longitudinal center axis of the third embodiment of the present invention.
Figure 5:
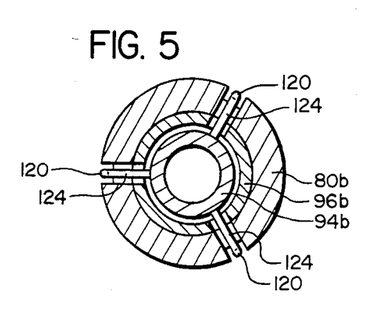
FIG. 5 is a sectional view taken along the line 5—5 of FIG. 4.

A third embodiment of the present invention is shown in FIGS. 4 and 5. Components of this third embodiment which are similar to those of the first and second embodiments will be given light numerical designations, with a "b" suffix distinguishing those of the third embodiment.

The main difference in this second embodiment is that in addition to having the compression spring 98b which performs a centering function, there are also provided a plurality of spring arms 120 which fit around the periphery of the housing section 80a. As shown in FIG. 5, there are three such spring arms 120, and each has a base end 122 by which it is spring mounted in the housing section 80a. There is also a lower bearing end 124 of each spring, and this comprises an inturned finger which extends inwardly to bear against the probe mounting structure 94b. Each spring arm 100 is provided with a related adjustment screw 126 which can be moved radially inwardly or outwardly to precisely position the arm 120.

In overall operation, this third embodiment is substantially the same as in the first embodiment. The essential difference in this third embodiment is the added apparatus to improve the centering of the probe 50a within proper tolerances.

It is to be recognized that various modifications could be made without departing from the basic teachings of the present invention.

What is claimed and desired to be secured by Letters Patent of the United States is:

1. A hole drilling and inspection assembly adapted to operate in conjunction with a locating jig having at least one locating hole to first make a drilled hole in a workpiece and then inspect the drilled hole, said assembly comprising:
   a. a drilling apparatus having a drill locating element positioned to come into engagement with said locating hole, and a drill member to move through said drill locating element and said locating hole to drill the hole in the workpiece along a hole alignment axis;
   b. an inspection apparatus comprising:
      1. a first inspection support housing having an inspection alignment axis and an inspection locating element, said support housing being adapted to be positioned with the inspection locating element engaging the locating hole of the locating jig and with the inspection alignment axis aligned with the hole alignment axis within a predetermined tolerance limit;
      2. a second movable housing mounted in said support housing for upward and downward axial movement along said inspection alignment axis relative to said support housing;
      3. an inspection probe having a lower laterally yielding inspection end contact portion adapted to yieldingly engage a hole surface defining the hole in the workpiece so that the end contact portion is centered in said hole, said probe having a probe alignment axis;
      4. said inspection probe also having an upper mounting end by which said probe is pivotally mounted in said second housing about an upper pivot location in a manner that the inspection end contact portion is able to be deflected laterally so that said probe alignment axis is deflected from said inspection alignment axis;

whereby under circumstances where after said hole has been drilled and said inspection apparatus has been positioned for inspection, and the inspection alignment axis is out of alignment with said hole alignment axis, the lower inspection end contact portion of the probe is able to deflect laterally about said upper pivot location, to deflect the probe alignment axis from the inspection alignment axis and place said end contact portion of the probe centrally located relative to the drilled hole in a manner that an accurate inspection of said hole can be obtained.

2. The assembly as recited in claim 1, wherein the upper mounting end of the probe is mounted to said second movable housing about a universal mounting means, whereby the inspection end contact portion of the probe can be deflected laterally in substantially all lateral directions.

3. The assembly as recited in claim 2, wherein said universal mounting is characterized in that the mounting end of the inspection probe has a curved contact surface which fits against a mounting curved contact surface of said second movable housing, so that the two curved contact surfaces can move relative to one another.

4. The assembly as recited in claim 3, wherein there is spring means interconnecting with said probe and said second movable housing in a manner to yieldingly urge the probe axis into alignment with the inspection alignment axis.

5. The assembly as recited in claim 2, wherein there is spring means interconnecting said probe and said second movable housing in a manner to yieldingly urge the robe axis into alignment with the inspection alignment axis.

6. The assembly as recited in claim 5, wherein said spring means comprises a compression spring means mounted around said inspection probe and pressing against said inspection probe and said second movable housing in a manner to urge said probe upwardly against said movable housing.

7. The assembly as recited in claim 5, wherein said spring means comprises spring finger means extending along said probe, said finger means having spring ends engaging said probe below said upper pivot location so as to center said probe.

8. The assembly as recited in claim 1, wherein said assembly comprises a robotic assembly, including robotic control means to first position said drill locating element into engagement with said locating hole and to cause said drill member to drill the hole in the workpiece, and then to move the locating element of the inspection apparatus into engagement with the locating hole and to cause said probe to move so that the inspection end contact portion moves into the drilled hole so as to inspect the same.

9. The assembly as recited in claim 1, wherein said inspection probe comprises a plurality of downwardly extending probe arms, each of which has a laterally deflectable end arm portion, with positioning of the end arm portions affecting an inspection operation of said probe, said probe is sufficiently easily deflectable to enable the end contact portions of the arms to become properly centered in the drilled hole.

10. The assembly as recited in claim 9, wherein there is spring means to yieldingly urge said probe into alignment with said second movable housing, with said spring means being sufficiently yielding so as to enable the end contact portions of the arms to be properly centered in the drilled hole.

11. An inspection apparatus adapted to operate in conjunction with a locating jig having at least one locating hole, and in conjunction with a drilling apparatus having a drill locating element positioned to come into engagement with said locating hole, and a drill member to move through said drill locating element and said locating hole to drill the hole in the workpiece along a hole alignment axis, said inspection apparatus comprising:
   a. a first inspection support housing having an inspection alignment axis and an inspection locating element, said support housing being adapted to be positioned with the inspection locating element engaging the locating hole of the locating jig and with the inspection alignment axis aligned with the hole alignment axis within a predetermined tolerance limit;
   b. a second movable housing mounted in said support housing for upward and downward axial movement along said inspection alignment axis relative to said support housing;
   c. an inspection probe having a lower laterally yielding inspection end contact portion adapted to yieldingly engage a hole surface defining the hole in the workpiece so that the end contact portion is centered in said hole, said probe having a probe alignment axis;
   d. said inspection probe also having an upper mounting end by which said probe is pivotally mounted in said second housing about an upper pivot location in a manner that the inspection end contact portion is able to be deflected laterally so that said probe alignment axis is deflected from said inspection alignment axis;
   whereby under circumstances where after said hole has been drilled and said inspection apparatus has been positioned for inspection, and the inspection alignment axis is out of alignment with said hole alignment axis, the lower inspection end contact portion of the probe is able to deflect laterally about said upper pivot location, to deflect the probe alignment axis from the inspection alignment axis and place said end contact portion of the probe centrally located relative to the drilled hole in a manner that an accurate inspection of said hole can be obtained.

12. The apparatus as recited in claim 11, wherein the upper mounting end of the probe is mounted to said second movable housing about a universal mounting means, whereby the inspection end contact portion of the probe can be deflected laterally in substantially all lateral directions.

13. The apparatus as recited in claim 12, wherein said universal mounting is characterized in that the mounting end of the inspection probe has a curved contact surface which fits against a mounting curved contact surface of said second movable housing, so that the two curved contact surfaces can move relative to one another.

14. The apparatus as recited in claim 13, wherein where is spring means interconnecting with said probe and said second movable housing in a manner to yieldingly urge the probe axis into alignment with the inspection alignment axis.

15. The apparatus as recited in claim 12, wherein there is spring means interconnecting said probe and said second movable housing in a manner to yieldingly urge the probe axis into alignment with the inspection alignment axis.

16. The apparatus as recited in claim 15, wherein said spring means comprises a compression spring means mounted around said inspection probe and pressing against said inspection probe and said second movable housing in a manner to urge said probe upwardly against said movable housing.

17. The apparatus as recited in claim 15, wherein said spring means comprises spring finger means extending along said probe, said finger means having spring ends engaging said probe below said upper pivot location so as to center said probe.

18. The apparatus as recited in claim 11, wherein said inspection probe comprises a plurality of downwardly extending probe arms, each of which has a laterally deflectable end arm portion, with positioning of the end arm portions affecting an inspection operation of said probe, said probe is sufficiently easily deflectable to enable the end contact portions of the arms to become properly centered in the drilled hole.

19. The apparatus as recited in claim 9, wherein there is spring means to yieldingly urge said probe into alignment with said second movable housing, with said spring means being sufficiently yielding so as to enable the end contact portions of the arms to be properly centered in the drilled hole.

20. A method of drilling and inspecting a hole in a workpiece, in conjunction with a locating jig having at least one locating hole, said method comprising:
   a. placing a drill locating element of a drilling apparatus into engagement with said locating hole, and moving a drill member of said drilling apparatus through said drill locating element and said locating hole to drill the hole in the workpiece along a hole alignment axis;
   b. placing an inspection locating element of a first inspection support housing of an inspection apparatus into engagement with the locating hole of the locating jig, in a manner that an inspection alignment axis of said inspection apparatus is aligned with the hole alignment axis within a predetermined tolerance limit;
   c. providing a movable housing in said first support housing for upward and downward axial movement along said inspection alignment axis relative to said first support housing, with said movable housing having mounted therein an inspection probe having a lower laterally yielding inspection end contact portion, and with said probe having a probe alignment axis, said probe also having an upper mounting end by which said probe is pivotally mounted in the second housing about an upper pivot location;
   d. moving said second housing downwardly relative to said first support housing so as to cause the lower laterally yielding inspection end contact portion of the probe to move through the locating hole and through the inspection locating element of the first support housing, and positioning the end contact portion of the probe in the drilled hole, with the end contact portion being centered in the drilled hole in a manner that any misalignment of the inspection alignment axis with the hole alignment axis is compensated for by a deflection of the probe alignment axis relative to the inspection alignment axis in a manner that said probe deflects laterally about said upper pivot location.

* * * * *